April 24, 1951 M. CAMRAS 2,549,771

MAGNETIC TRANSDUCER HEAD

Filed Aug. 16, 1946 2 Sheets-Sheet 1

Inventor
MARVIN CAMRAS by The Firm of Charles W. Hills Attys.

April 24, 1951 M. CAMRAS 2,549,771

MAGNETIC TRANSDUCER HEAD

Filed Aug. 16, 1946 2 Sheets-Sheet 2

Inventor
MARVIN CAMRAS by The Firm of Charles W. Hills Attys

Patented Apr. 24, 1951 2,549,771

UNITED STATES PATENT OFFICE 2,549,771

MAGNETIC TRANSDUCER HEAD

Marvin Camras, Chicago, Ill., assignor to Armour Research Foundation of Illinois Institute of Technology, Chicago, Ill., a corporation of Illinois Application August 16, 1946, Serial No. 690,877

9 Claims. (Cl. 179—100.2)

This invention relates to a magnetic recording and reproducing head, and more particularly to an electro-magnetic transducer head which is especially suited for use with an elongated magnetizable record member such as may be used with magnetic recording and reproducing devices.

One common form of magnetic recording and reproducing device is a machine employing a tape of magnetizable material or a tape of non-magnetic material having a magnetizable coating or impregnation thereon. Many of these machines employing a tape record member are so arranged that the magnetic record lies along the tape or is recorded along the tape in a plurality of channels.

One of the principal features and objects of the present invention is to provide novel means for electric magnetic transducer heads employed with multiple-channel tapes which prevents interference with adjacent channels while one channel is being used.

A further object of the present invention is to provide a novel electro-magnetic transducer head for recording and reproducing devices in which a high permeability keeper overlies the channels not being used.

A further object of the present invention is to provide an electro-magnetic transducer head having a pair of confronting polar portions having a non-magnetic gap therebetween over which a portion of a tape record member passes and having a soft-iron boot laterally disposed with respect thereto over which another portion of the tape rides.

A still further object of the present invention is to provide novel means for preventing interference between adjacent channels of a multiple-channel tape both in recording and in reproduction.

Another and still further object of the present invention is to provide a novel pole structure and core structure for a magnetic recording or reproducing head.

The novel features which I believe to be characteristic of my invention are set forth with particularity in the appended claims. My invention itself, however, both as to its organization, manner of construction and method of operation, together with further objects and advantages thereof, may best be understood by reference to the following description taken in connection with the accompanying drawings, in which:

Figure 6:
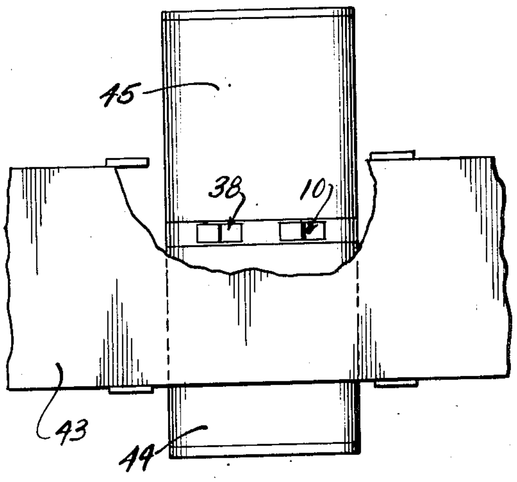
Figure 5:
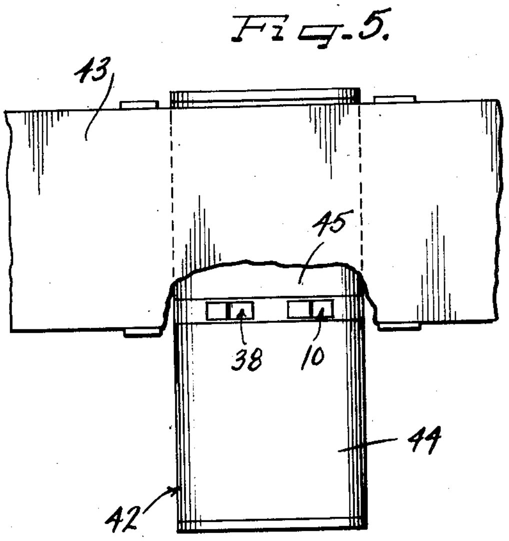

Figure 5 is a plan view of a modified form of the present invention wherein an extremely wide tape is used having a large number of parallel recording channels, the tape being in a position to record or reproduce from a channel adjacent one edge of the tape; and Figure 6 is a view similar to Figure 5 but with the head moved so that one of the intermediate channels along the tape is in active cooperation with the recording and reproducing head.

Figures 1, 2:
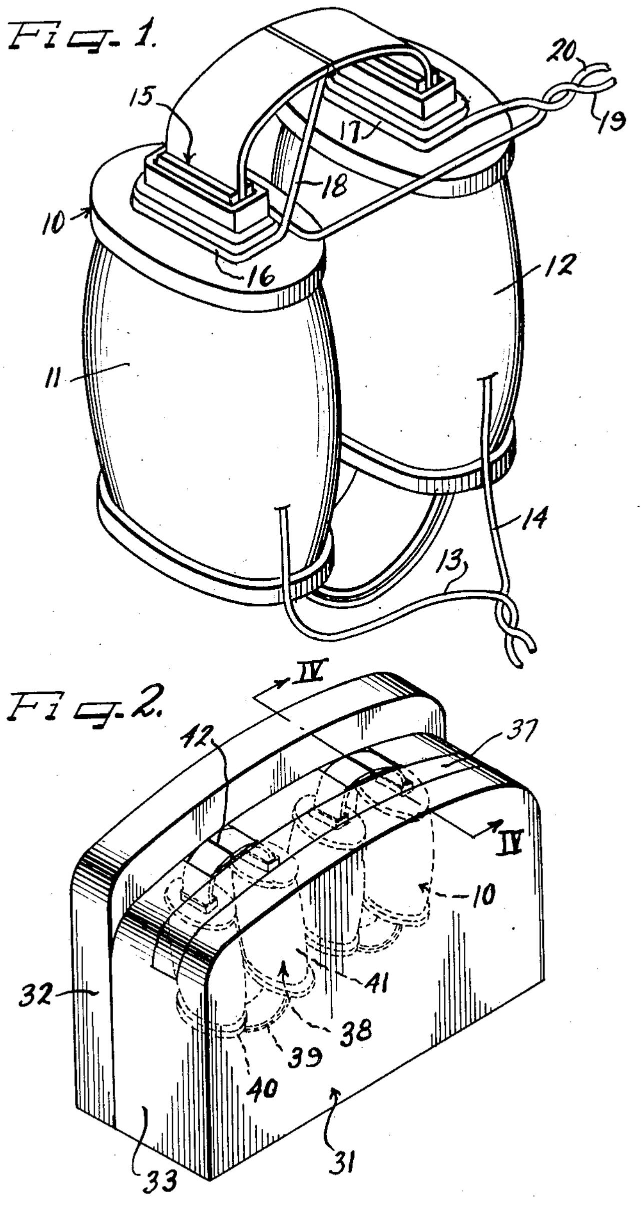
Figure 1 is an isometric view of the core, pole and coil structure of a magnetic transducer or erase head.
Figure 2 is an isometric view showing a pair of structures similar to the one illustrated in Figure 1 mounted in a complete electro-magnetic transducer head for a magnetic recording and reproducing device.

In Figure 1 of the drawings, the transducer or magnetic recording and reproducing head 10 includes a pair of signal coils 11 and 12 which are preferably series connected. The leads from these two coils 11 and 12 are indicated at 13 and 14.

In addition to the coils 11 and 12, a few turns of wire are taken around the core structure generally indicated at 15 above each coil 11 and 12 as at 16 and 17. These high frequency windings 16 and 17 are wound in a reverse sense with respect to each other and series connected by the cross lead 18. The input leads of the coils 16 and 17 are indicated at 19 and 20.

Figures 3, 4:
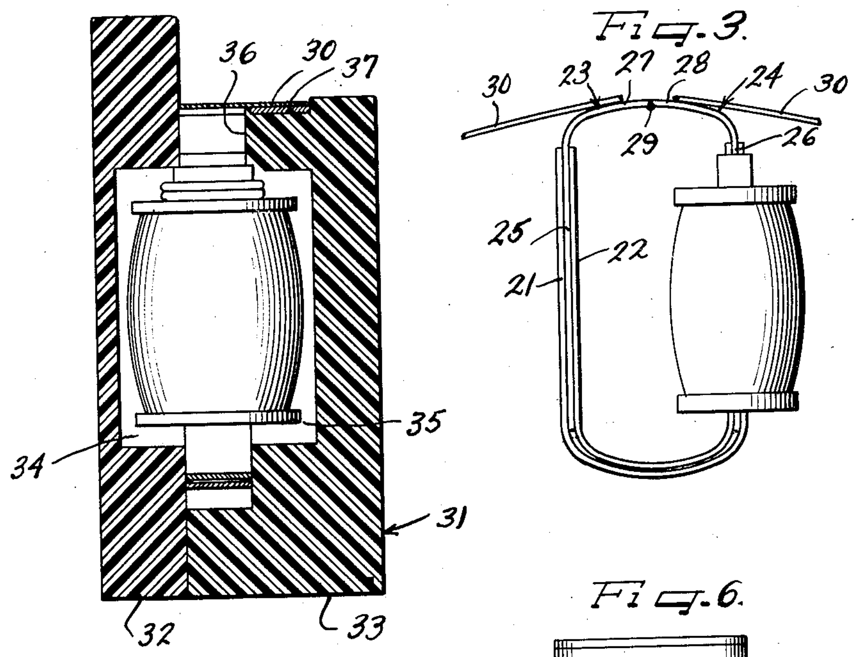
Figure 3 is a front elevational view of the structure shown in Figure 1 with one coil removed in order to show the details of the core structure.
Figure 4 is a vertical sectional view taken along the line IV—IV of Figure 2.

The core and pole structures of the head 10 may be seen best from an inspection of Figure 3 of the drawings. As shown, it is made up of two U-shaped members 21 and 22 and two inverted L-shaped members 23 and 24. The vertical leg 25 on the L-shaped piece 23 and the vertical leg 26 on the L-shaped piece 24 extend down between the upstanding legs of the two U-shaped pieces 21 and 22 in snug nested engagement therewith. Thus, it is apparent that the inner surface portion of the legs of the U-shaped piece 21 and the outer surface portions of the legs of the U-shaped piece 22 defines snug support grooves for the vertical legs of the L-shaped pieces. The L-shaped pole pieces 23 and 24 also have their short legs 27 and 28 projecting toward each other to form polar portions. A short non-metallic gap lies between the two confronting ends of the pole portions 27 and 28. While this may be an air gap, it preferably is filled with solder, or other suitable non-magnetic material 29. It is also preferable that the legs 27 and 28 be slightly curved as shown in the various figures of the drawings, and their upper surface is smooth so that an elongated magnetizable tape such as the tape 30 is arranged to ride thereover.

It will be apparent that the two nested U-shaped pole pieces 21 and 22 define grooves to receive the legs of the L-shaped pieces 25 and 26. Moreover, the depth of these grooves is approximately the length of the leg portions of the pole pieces 25 and 26 inserted therein, thereby providing a maximum degree of efficiency and most effective utilization of material.

As shown in Figure 3, the tape 30 is broken away over the center portion to more clearly show the pole structure, and as shown in Figure 4, the tape 30 is of the dual-channel type. That is to say, the tape 30 is slightly more than twice the width of the pole pieces 27 and 28.

As may be seen best in Figures 2 and 4 of the drawings, the magnetic transducer head 10 is assembled in a two-piece housing of non-magnetic, non-conducting material indicated generally at 31. This housing 31 includes a rear housing member 32 and a front housing member 33 which are provided with confronting recessed portions 34 and 35, respectively, into which the head 10 is assembled as indicated in Figure 4. The upper wall of the plate 33 is provided with an opening 36 through which the upper surface of the polar portions 27 and 28 slightly project. Also mounted in the upper surface of the plate member 33 is a keeper 37 which is formed of soft iron or other suitable magnetic material having relatively high permeability and low magnetic retentivity.

This keeper 37 is in the form of a strap embedded in the upper surface of the plate member 33 and extends over the entire upper surface, so that approximately half of the width of the tape 30, as it rides over the housing 31, is in contact with this keeper 37. This keeper thus prevents the magnetic field set up by the head 10 during the recording process from influencing the adjacent channel on the tape 30, and also on playback prevents stray pick-up from the adjacent channel.

As shown in Figure 2, the housing 31 is also arranged to have mounted therein an erase coil unit 38 which includes a core 39 similar to the core of the magnetic recording and reproducing head 10 and having a pair of coils 40 and 41 thereon. The erase coil will not, however, have any auxiliary high frequency windings such as the high frequency windings 16 and 17 on the recording and reproducing head 10, and the non-magnetic gap between the confronting polar portions of the core 39 will be slightly wider than the gap in the recording head 10. This is to enable complete demagnetization of the channel on the record member 30 when it passes over the gap 42 in the erase head.

The coils 40 and 41 are, of course, supplied with high frequency electric energy during the recording process in accordance with a technique which is well known to those skilled in the art. It will furthermore be understood that the record member 30 passes over first the erase head 38 and then over the recording and reproducing head 10 during the recording operation.

It will be observed that the keeper 37 also lies adjacent the erase head 38 so as to prevent interference with the adjacent channel.

In Figures 5 and 6 of the drawings, I have illustrated a modified form of the present invention. In this case, a housing 42 is provided for the erase head 38 and the magnetic recording and reproducing head 10 which is much wider than that illustrated in Figures 2 and 4 of the drawings. This is to accommodate the record member or magnetizable tape 43 which is sufficiently wide to enable a large number of parallel channels to be recorded thereon and reproduced therefrom. This will be readily appreciated from a comparison of the width of the erase head 38 and the magetic recording and reproducing head 10 in comparison with the width of the tape 43 as shown in Figure 5 of the drawings. The housing 42 containing the erase head 38 and the magnetic recording and reproducing head 10 is arranged to be moved relative to the width of the tape so that successive parallel channels may be recorded on or reproduced from the tape 43. This will be clearly understood from a comparison of the tape 43 with respect to the housing 42 after it has been moved over several channels.

In the construction shown in Figures 5 and 6 of the drawings, two relatively wide keepers 44 and 45 are provided on either side of the heads 38 and 10. Thus, all of the channels not being used are prevented from being influenced by the fields set up in the region of the channel which is being used, and prevents stray pick-up on playback.

By the terms "paramagnetic" and "magnetic" as used in the specification hereof and the accompanying claims, I intend to mean a material such as iron or the like having a relatively high magnetic permeability as compared with the magnetic permeability of air, insulating materials etc.

While I have shown certain particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A magnetic transducer head comprising a paramagnetic core having a pair of confronting poles with a non-magnetic gap therebetween over which a portion of the width of a traveling magnetic record member is arranged to pass, a paramagnetic member having a continuous surface portion lying adjacent to and slightly spaced from said poles and the gap defined thereby over which another portion of the width of said record member is arranged to pass as said first portion passes over said poles, both said poles and said paramagnetic member constituting a record member contacting surface.

2. A magnetic transducer head comprising a paramagnetic core having a pair of confronting poles with a non-magnetic gap therebetween, and a paramagnetic member having a continuous surface portion lying adjacent to said poles and gap and spaced therefrom, said poles and said paramagnetic member constituting a record member contacting surface over which a traveling record member is arranged to pass in a direction substantially longitudinally of the axes of said poles.

3. A magnetic transducer head comprising a paramagnetic core having a pair of confronting poles with a non-magnetic gap therebetween, and a paramagnetic member providing a continuous surface portion lying in close proximity to but spaced from said poles and the gap defined thereby, the upper surface of said poles and the upper surface of said paramagnetic member lying in substantially a common plane and together constituting a record contacting surface.

4. A magnetic transducer head comprising a paramagnetic core having a pair of confronting poles with a non-magnetic gap therebetween and constituting a partial record contacting surface over which a portion of the width of a traveling magnetic record member is arranged to pass, and at least one paramagnetic member lying adjacent to and slightly spaced from said poles constituting a continuous record contacting surface over which other portions of the width of said record member are arranged to pass as said first portion passes over said poles in a direction substantially longitudinally of the axes of said poles.

5. A magnetic transducer head comprising a paramagnetic core having a pair of confronting poles with a non-magnetic gap therebetween and constituting a partial record contacting surface over which a portion of the width of a traveling magnetic record member is arranged to pass, and a pair of paramagnetic members constituting continuous record contacting surface portions on opposite sides of said poles and gap and slightly spaced therefrom over which other portions of the width of said record member are arranged to pass as said first portion passes over said poles.

6. A magnetic transducer head comprising a paramagnetic core having a pair of confronting poles with a non-magnetic gap therebetween over which a portion of the width of a traveling record member is arranged to pass, a supporting member of substantially non-magnetic, non-conducting material for said paramagnetic core, and a paramagnetic member also supported by said supporting member in a position lying adjacent to and slightly spaced from said poles, said paramagnetic member providing a continuous surface portion adjacent said poles and gap over which another portion of the width of said record member is arranged to pass as said first portion passes over said poles, said supporting structure including a lip lying between said poles and said paramagnetic member.

7. A magnetic recording and reproducing head assembly comprising a supporting structure of substantially non-magnetic, non-conducting material, a pair of paramagnetic cores each having a pair of confronting poles, said pairs of poles being substantially in a single line and arranged to have a traveling magnetic record member pass over first one pair of poles and then over a second pair of poles, an erase coil on said core having said first pair of poles, a signal coil on said core having said second pair of poles, the upper surface of each of said pairs of poles providing a supporting surface for a portion of the width of said traveling record member, and a paramagnetic member mounted on said supporting structure alongside of and slightly spaced from said pairs of poles, the upper surface of said paramagnetic member also being arranged to support a portion of the width of said traveling record member.

8. A magnetic transducer head assembly for use with a magnetizable record medium, said assembly including a core portion of magnetizable material defining a pair of confronting pole pieces over one edge of which a portion of said medium overhangs, and a magnetic keeper member disposed adjacent said portion of said medium magnetically to isolate said portion of said medium from said pole pieces, said pole pieces and said keeper member constituting a contact surface for the record medium.

9. In an electromagnetic transducer head assembly of the type comprising a paramagnetic core member defining a non-magnetic gap and having portions adjacent thereto defining a portion of a face to receive a magnetizable record medium, a paramagnetic keeper member positioned to define further portions of said face, both of said portions of each of said faces together constituting a contact surface for the record medium.

MARVIN CAMRAS.

REFERENCES CITED

The following references are of record in the file of this patent:

UNITED STATES PATENTS

| Number | Name | Date |
|---|---|---|
| 1,827,051 | Thomas | Oct. 13, 1931 |
| 2,089,287 | Molloy | Aug. 10, 1937 |
| 2,144,844 | Hickman | Jan. 24, 1939 |
| 2,195,192 | Schuller | Mar. 26, 1940 |
| 2,277,305 | Clopton | Mar. 24, 1942 |
| 2,351,007 | Camras | June 13, 1944 |
| 2,361,752 | Eilenberger | Oct. 31, 1944 |

FOREIGN PATENTS

| Number | Country | Date |
|---|---|---|
| 103,425 | Sweden | Jan. 5, 1942 |
| 617,796 | Germany | Aug. 28, 1935 |